US012764003B2

(12) United States Patent
Corlay

(10) Patent No.: US 12,764,003 B2
(45) Date of Patent: *Oct. 13, 2026

(54) METHOD AND DEVICE FOR TRANSMITTING BINARY DATA

(71) Applicant: MITSUBISHI ELECTRIC CORPORATION, Tokyo (JP)

(72) Inventor: Vincent Corlay, Rennes Cedex (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 71 days.

This patent is subject to a terminal disclaimer.

(21) Appl. No.: 18/851,204

(22) PCT Filed: Dec. 16, 2022

(86) PCT No.: PCT/JP2022/047499

§ 371 (c)(1),
(2) Date: Sep. 26, 2024

(87) PCT Pub. No.: WO2023/199554

PCT Pub. Date: Oct. 19, 2023

(65) Prior Publication Data

US 2025/0202743 A1 Jun. 19, 2025

(30) Foreign Application Priority Data

Apr. 13, 2022 (EP) .................................... 22305530

(51) Int. Cl.
*H04L 27/04* (2006.01)

(52) U.S. Cl.
CPC .................................... *H04L 27/04* (2013.01)

(58) Field of Classification Search
CPC .............................. H04L 27/04; H04L 1/0042

(Continued)

(56) References Cited

U.S. PATENT DOCUMENTS 12,381,765 B2 * 8/2025 Corlay .................... H04L 27/04
2003/0227867 A1 * 12/2003 Xiong ................. H04L 27/2602
375/279

(Continued)

FOREIGN PATENT DOCUMENTS

EP 4 099 651 A1 12/2022

OTHER PUBLICATIONS

Böcherer et. al., "Bandwidth Efficient and Rate-Matched Low-Density Parity-Check Coded Modulation", IEEE Transactions on Communications, IEEE Service Center, vol. 63, No. 12, Dec. 1, 2015, pp. 4651-4665.

(Continued)

*Primary Examiner* — Emmanuel Bayard
(74) *Attorney, Agent, or Firm* — Birch, Stewart, Kolasch & Birch, LLP

(57) ABSTRACT

A method for transmitting binary data using an M-ASK constellation divided into M/2 sets of two symbols is disclosed. Each set of index i is associated with a probability $p_i$ of transmitting the first symbol of the set. First, m−1 bits are obtained from a binary source where $m=\log_2 M$. A binary source is then selected in a plurality of binary sources responsive to said m−1 bits, each binary source of index i being associated with a probability of outputting a bit zero equal to $p_i$. A symbol of the M-ASK constellation is obtained that is associated with the binary word formed by the m−1 bits and the bit obtained from the selected source. The symbol is finally transmitted to a receiver over a communication channel.

19 Claims, 5 Drawing Sheets

(58) Field of Classification Search
USPC .......................... 375/268, 295, 300, 320, 309
See application file for complete search history.

(56) References Cited

U.S. PATENT DOCUMENTS

| | | | | |
|---|---|---|---|---|
| 2015/0124893 | A1* | 5/2015 | Yang ..................... | H04L 1/0047 375/259 |
| 2018/0026725 | A1* | 1/2018 | Cho ...................... | H04L 1/0042 714/776 |
| 2020/0328922 | A1* | 10/2020 | Courtat .................. | G06N 3/084 |

OTHER PUBLICATIONS

Böcherer et. al., "Probabilistic Shaping and Forward Error Correction for Fiber-Optic Communication Systems", Journal of Lightwave Technology, IEEE, vol. 37, No. 2, Jan. 15, 2019, pp. 230-244.
Işcan et. al., "Probabilistically Shaped Multi-Level Coding with Polar Codes for Fading Channels", 2018 IEEE Globecom Workshops (GC WKSHPS), IEEE, Dec. 9, 2018, total 5 pages.
The International Search Report (PCT/ISA/210) issued in PCT/JP2022/047499, mailed on Mar. 30, 2023.
The Written Opinion of the International Searching Authority (PCT/ISA/237) issued in PCT/JP2022/047499, mailed on Mar. 30, 2023.
Corlay et al., "A Simple Sign-Bit Probabilistic Shaping Scheme," IEEE Communications Letters, vol. 26, No. 4, Jan. 18, 2022, pp. 763-767 (6 pages total).
Japanese Office Action for Japanese Application No. 2024-561137, dated Jun. 3, 2025, with English translation.

* cited by examiner

METHOD AND DEVICE FOR TRANSMITTING BINARY DATA

TECHNICAL FIELD

At least one of the present embodiments generally relates to a method for transmitting binary data using an M-ASK constellation (ASK being the English acronym of "Amplitude-Shift Keying"). At least one of the present embodiments also relates to a corresponding transmitter.

BACKGROUND ART

In a communication system, a transmitter is coupled to a receiver by way of a communication channel (e.g. an optical fiber). The transmitter usually comprises an encoder configured to encode the input data, e.g. a bitstream, into symbols belonging to a finite set, called a constellation. One dimensional ASK (English acronym of "Amplitude-Shift Keying") and two dimensional QAM (English acronym of "Quadrature-Amplitude Keying") are examples of such constellations. Here, one dimensional or two dimensional constellations mean that the symbols take value in R or in $R^2$, respectively, R being the set of real numbers.

These symbols are then transmitted over the communication channel to the receiver. The receiver comprises a decoder configured to decode the received symbols into output data.

Communication systems in which uniformly distributed symbols are transmitted usually lead to a shaping loss. Therefore, in order to approach the channel capacity, it is known that the transmitter should process the input data to change the probability distribution of the transmitted symbols. More precisely, the input data are processed so that the transmitted symbols have a non-uniform probability distribution that is adapted to the communication channel. This operation, called probabilistic shaping, can provide energy savings also known as shaping gain. For a gaussian channel, it is known that the Maxwell-Boltzmann distribution yields quasi-optimal performance. However, processing input data to fit the Maxwell-Boltzmann distribution is complex to implement.

It is thus desirable to find a method for transmitting binary data that is easy to implement while being performant and that is also adapted to non-Gaussian channel.

SUMMARY OF INVENTION

At least one of the present embodiments generally relates to a method, in a transmitter, for transmitting binary data using an M-ASK constellation divided into M/2 sets of two symbols, each set of index i being associated with a probability $p_i$ of transmitting the first symbol and a probability $1-p_i$ of transmitting the second symbol of the set and each symbol of the M-ASK constellation being associated with a binary word defined using natural labelling, said method comprising:

a) obtaining m−1 bits from a binary source where $m=\log_2 M$;
b) selecting a binary source in a plurality of binary sources responsive to said m−1 bits, each binary source of index i being associated with a probability of outputting a bit zero equal to $p_i$;
c) obtaining one bit from the selected source;
d) obtaining a symbol of the M-ASK constellation associated with the binary word formed by the m−1 bits obtained from the binary source and the one bit obtained from the selected source;
e) transmitting said obtained symbol to a receiver over a communication channel.

This transmitting method is easier to implement than transmitting methods trying to fit the Maxwell-Boltzmann distribution. More precisely, the above method makes it possible to implement a shaping operation using a reduced number of binary sources.

In one embodiment, the given labelling is a natural labelling and each set of index i comprises the i th and i+M/2 th symbols of the M-ASK constellation, where i ϵ[1;M/2].

In one embodiment, said given labelling is a Gray labelling and each set of index i comprises the i th and M/2+1-i th symbols of the M-ASK constellation, where i ϵ

$$[1; M/4] \cup \left[\frac{M}{2}+1; \frac{3M}{4}\right].$$

In one embodiment, the m−1 bits obtained from the binary source are the less significant bits of the binary word and the bit obtained from the selected source is the most significant bit of the binary word.

In one embodiment, the binary source is an equiprobable binary source.

In one embodiment, selecting a binary source in a plurality of binary sources responsive to said m−1 bits comprises:

determining a decimal value of the binary sequence formed by the m−1 bits; and selecting the binary source whose index equal said decimal value incremented by one.

In one embodiment, the plurality of binary sources comprises 2m−1 binary sources.

In one embodiment, $$p_i = 1 - p_{\frac{M}{2}-i+1},\ 1 \le i \le \frac{M}{4},$$

the plurality of binary sources is reduced to $2^{m-2}$ binary sources and selecting a binary source responsive to said m−1 bits comprises:

determining a decimal value D of the binary sequence formed by the m−1 bits; and selecting the binary source whose index equal M/2-D in the case where $$\frac{M}{4} + 1 \le D + 1 \le \frac{M}{2};$$

and selecting the binary source whose index equal said decimal value incremented by one, otherwise;

and, in the case where the binary source whose index equal M/2-D is selected, the bit obtained from the selected source is flipped before obtaining a symbol of the M-ASK constellation.

In one embodiment, $$p_i = 1 - p_{\frac{M}{2}-i+1},\ 1 \le i \le \frac{M}{4},$$

the plurality of binary sources is reduced to $2^{m-2}$ binary sources and wherein selecting a binary source responsive to said m−1 bits comprises:

determining a decimal value D of the binary sequence formed by the m−1 bits; and selecting the binary source whose index equal D+1 mod (M/2+1), where mod ( ) is the modulo operator.

In one embodiment, each binary source of index i in the plurality of binary sources is obtained from the equiprobable binary source by applying binary distribution matching on sequences of $$\frac{r}{S\max}H(p_i) \text{ bits,}$$

where $S_{max}$ is the number of sources in the plurality of binary sources, H ($p_i$) denotes the binary entropy with parameter $p_i$ and r being an integer greater than or equal to 1.

In one embodiment, the method further comprises:

encoding r times (m−1)*k bits obtained from the equiprobable binary source using an error correcting code into (m−1)*n bits, where n and k are integers;

obtaining each binary source of index i in the plurality of binary sources from the equiprobable binary source by applying binary distribution matching on sequences of $$\frac{r*n}{S\max}H(p_i) \text{ bits}$$

obtained from the equiprobable binary source, where $S_{max}$ is the number of sources in the plurality of binary sources and H ($p_i$) denotes the binary entropy with parameter $p_i$; and applying a) to e) on each of the r*n sets of (m−1) bits.

In one embodiment, the method further comprises obtaining the probabilities $p_i$ from a table and transmitting to said receiver at least one index entry indicating the obtained probabilities.

In one embodiment, the method further comprises estimating the probabilities $p_i$ from a predefined communication channel distribution and transmitting said estimated probabilities to said receiver.

In one embodiment, the method further comprises receiving the probabilities $p_i$ from the receiver.

At least one of the present embodiments generally relates to a transmitter configured to transmit binary data using an M-ASK constellation divided into M/2 sets of two symbols is disclosed, each set of index i being associated with a probability $p_i$ of transmitting the first symbol of the set and a probability 1−$p_i$ of transmitting the second symbol of the set and each symbol of the M-ASK constellation being associated with a binary word defined using natural labelling. The transmitter comprising at least one processor configured to:

a) obtain m−1 bits from a binary source where $m=\log_2 M$;

b) select a binary source in a plurality of binary sources responsive to said m−1 bits, each binary source of index i being associated with a probability of outputting a bit zero equal to $p_i$;

c) obtain one bit from the selected source;

d) obtaining a symbol of the M-ASK constellation associated with the binary word formed by the m−1 bits obtained from the binary source and the bit obtained from the selected source;

e) transmit said obtained symbol to a receiver over a communication channel.

The various embodiments disclosed with respect to the method also apply to the transmitter.

A computer program product is disclosed that comprises program code instructions that can be loaded in a programmable device, the program code instructions causing implementation of the method according to anyone of the previous embodiments the program code instructions are run by the programmable device.

A storage medium is disclosed that stores a computer program comprising program code instructions, the program code instructions causing implementation of the method according to anyone of the previous embodiments when the program code instructions are read from the storage medium and run by the programmable device.

The characteristics of the invention will emerge more clearly from a reading of the following description of at least one example of embodiment, said description being produced with reference to the accompanying drawings.

DESCRIPTION OF EMBODIMENTS

Figure 1:
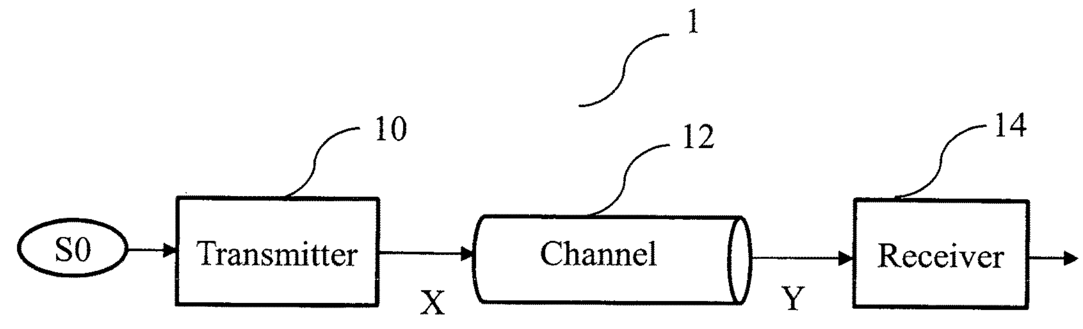
FIG. 1 illustrates schematically a communication system according to a specific embodiment.

FIG. 1 illustrates schematically a communication system 1 in which the present embodiments may be implemented. The communication system 1 comprises a transmitter 10 and a receiver 14 that are coupled to one another by way of a communication channel 12. The transmitter 10 is fed with input data by at least one equiprobable binary source S0 and outputs symbols selected in a given alphabet $\mathcal{X}$ of symbols. The input data are for example bits of an audio/video bitstream. In an exemplary embodiment, the alphabet $\mathcal{X}$ is an M-ASK constellation, where $M=2^m$ with m being an integer. The symbols of an M-ASK constellations are defined as follows:

$$\mathcal{X}=\{-2^m+1, \ldots, -3, -1, +1, +3, \ldots, +2^m-1\}.$$

Figure 2:
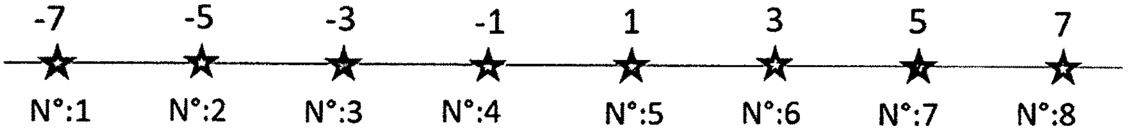
FIG. 2 depicts the symbols of an 8-ASK constellation.

Consequently, each symbol in this constellation can be represented by a sequence of $m=\log_2 M$ bits. FIG. 2 depicts the symbols of an 8-ASK constellation wherein the first symbol is-7 and the last one is 7. In the following, the various embodiments are described with reference to the ASK modulation. It will be appreciated, however, that the present embodiments are not restricted to the ASK modulation. As an example, it may also be used with the QAM modulation.

With reference to FIG. 1, let X be a discrete random variable representing the symbols at the input of the communication channel 12 with probability distribution $$p(x_i)=p(X_i=x_i), x_i \in \mathcal{X}.$$

Let $p(y|x_i)$ be the channel distribution. e.g. with a Gaussian channel $$p(y|x_i) \sim \mathcal{N}(x_i, \sigma^2),$$

for all $x_i$. Let Y be a random variable representing the communication channel output. In the case of a Gaussian channel, Y is defined as follows:

$$Y=X+W,$$

where W is a Gaussian noise, e.g.

$$W \sim \mathcal{N}(0, \sigma^2).$$

For the Gaussian channel, the signal-to-noise ratio (SNR) is defined as follows:

$$SNR=\frac{E[|X|^2]}{E[|W|^2]}.$$

Given any communication channel, let p*(x) be the distribution of the input X that maximizes the mutual information (MI) for a given constellation $$p^*(x)=\underset{p(x), E[|X|^2] \le P}{\arg\max}\ I(X;Y),$$

where P is the maximum average power. The quantity $$\max_{E[|X|^2] \le P} I(X;Y),$$

where the maximization is not only over the probability distribution but also over all possible inputs, is called the channel capacity. In the following, a discrete input is considered and optimization is only done over its distribution. The constellation (i.e., the set of positions of the elements of the discrete input) is not an optimization variable.

$\widehat{p^*}$*(x) is defined as the set of quasi-optimal distributions, i.e.

$$p(x) \in \widehat{p^*}(x) \text{ if } I(X;Y) \ge \underset{p(x), E[|X|^2] \le P}{\arg\max}\ I(X;Y) = \varepsilon,$$

where ε is a quantity whose magnitude depends on the requirements of the communication systems.

The aim of probabilistic shaping is to process the input such that its probability distribution maximizes, or almost maximizes, the mutual information I (X; Y). Said otherwise, the distribution of the input should be in $\widehat{p^*}$*(x).

For the M-ASK constellation, p(x) is often chosen as the MB distribution (English acronym of "Maxwell-Boltzmann distribution"). Indeed, in this case, the obtained performance is close to the one obtained with p*(x) (i.e. $P_{MB}(x) \in \widehat{p^*}(x)$ for ε small). However, implementing the MB distribution is complex.

According to a first specific embodiment defined in order to limit the complexity in the case of M-ASK, the set of possible distributions is limited to one that can be expressed as follows:

$$\text{For all } 1 \le i \le \frac{M}{2},\ \frac{p\left(x_{i+\frac{M}{2}}\right)}{\alpha}=1-\frac{p(x_i)}{\alpha}, \text{ where } \alpha=\frac{1}{M/2}$$

is a scaling constant used to have the sum of the probabilities equal to 1. Let us denote the variable $$\frac{p(x_i)}{\alpha}$$

by $p_i$. Consequently, the mutual information is now optimized with respect to the set $\{p_i\}$, $$1 \le i \le \frac{M}{2}$$

$$\{p_i\}^*=\underset{\{p_i\},\ E[|X|^2] \le P}{\arg\max}\ I(X;Y). \tag{1}$$

Thus according to the present principles, the M-ASK constellation is divided into M/2 sets, each set of index i containing the i th and $$i+\frac{M}{2}$$

symbols, for all i such that $$1 \le i \le \frac{M}{2}.$$

In the following, "i th symbol" is to be interpreted as the symbol of index i. In the same way, the "

$$i+\frac{M}{2}$$

th symbol" is to be interpreted as the symbol of index $$i+\frac{M}{2}.$$

Thus, in the case of 8-ASK, the sets of symbols are defined as in the table below.

| Sets | Index of the sets | Probability values |
|---|---|---|
| {−7, 1} | 1 | $p_1$ |
| {−5, 3} | 2 | $p_2$ |
| {−3, 5} | 3 | $p_3$ |
| {−1, 7} | 4 | $p_4$ |

A shaping encoder according to one embodiment is thus configured to select randomly one set; of the M/2 sets with equal probability (namely α) and thus transmits the first symbol of set; with probability $p_i$ and the second one with probability 1−p. The selection of a set may involve an error-correcting code. For each $set_i$ the probabilities $p_i$ are known by both the transmitter and the receiver.

According to a second specific embodiment defined in order to limit the complexity in the case of M-ASK, the set of possible distributions is limited to one that can be expressed as follows:

$$\text{For all } 1 \le i \le \frac{M}{4} \text{ and } M/2+1 \le i \le \frac{3M}{4},\ \frac{p\left(x_{\frac{M}{2}+1-i}\right)}{\alpha} = 1 - \frac{p(x_i)}{\alpha},$$

$$\text{where } \alpha = \frac{1}{M/2}$$

is a scaling constant used to have the sum of the probabilities equal to 1. Let us denote the variable $$\frac{p(x_i)}{\alpha}$$

by $p_i$. Consequently, the mutual information is now optimized with respect to the set $\{p_i\}$, $$1 \le i \le \frac{M}{4} \text{ and } M/2+1 \le i \le \frac{3M}{4}:$$

$$\{p_i\}^* = \underset{\{p_i\}, E[|X|^2] \le P}{\arg\max}\ I(X;Y). \tag{1}$$

Thus according to the present principles, the M-ASK constellation is divided into M/2 sets, each set of index i containing the i th and $$\frac{M}{2}+1-i$$

symbols, i.e. the symbol of index i and the symbol of index $$\frac{M}{2}+1-i,$$

for all i such that $$1 \le i \le \frac{M}{4} \text{ and } \frac{M}{2}+1 \le i \le \frac{3M}{4}.$$

Thus, in the case of 8-ASK, the sets of symbols are defined as in the table below.

| Sets | Index of the sets | Probability values |
|---|---|---|
| {−7, −1} | 1 | $p_1$ |
| {−5, −3} | 2 | $p_2$ |
| {1, 7} | 3 | $p_3$ |
| {3, 5} | 4 | $p_4$ |

A shaping encoder according to one embodiment is thus configured to select randomly one set; of the M/2 sets with equal probability (namely α) and thus transmits the first symbol of $set_i$ with probability $p_i$ and the second one with probability $1-p_i$. The selection of a set may involve an error-correcting code. For each $set_i$ the probabilities $p_i$ are known by both the transmitter and the receiver.

In a first embodiment, the probability values $p_i$ are computed offline for a given channel distribution. For example, for a Gaussian distribution of the noise in the channel, the probability values $p_i$ are computed offline once and for all and are thus not modified afterwards.

In a second embodiment, the probability values $p_i$ are computed offline for a given range of parameters of the communication channel, and stored in a table that is shared between the transmitter 10 and receiver 14. For example, if the channel distribution is Gaussian, the parameter may be the SNR of said communication channel. Therefore, in the table, one predefined set of $p_i$ values is associated with each predefined range of SNR values. The transmitter 10 thus selects the predefined set of $p_i$ values from the table responsive to the current SNR value and informs the receiver 14 accordingly.

In a third embodiment, the channel distribution is estimated by the receiver 14 after the reception of pilot symbols. Then, the receiver 14 optimizes the $p_i$ values and feeds them back to the transmitter 10 by using a signaling channel. Alternatively, the receiver 14 estimates the channel distribution and sends the estimated channel distribution to the transmitter 10 which optimizes the $p_i$ values and feeds them back to the receiver 14. The optimization step of the set of $p_i$ values may be a linear search, i.e. defining a subset of possible $p_i$ values and computing the mutual information associated with the estimated channel distribution. The chosen $p_i$ values are the one that maximizes the mutual information. In a variant, the set of $p_i$ values is obtained by solving an optimization problem, such as Equation (1), where the following constraints applies on the $p_i$ values:

$$p_{i+M/2}=1-p_i.$$

Figure 3A:
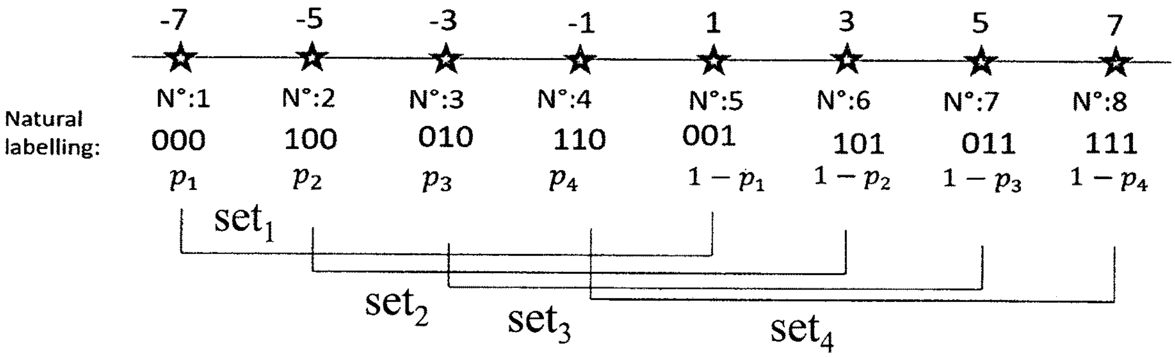
FIG. 3A illustrates the principles of the division of an M-ASK constellation into M/2 sets of two symbols according to a specific embodiment.
Figure 4A:
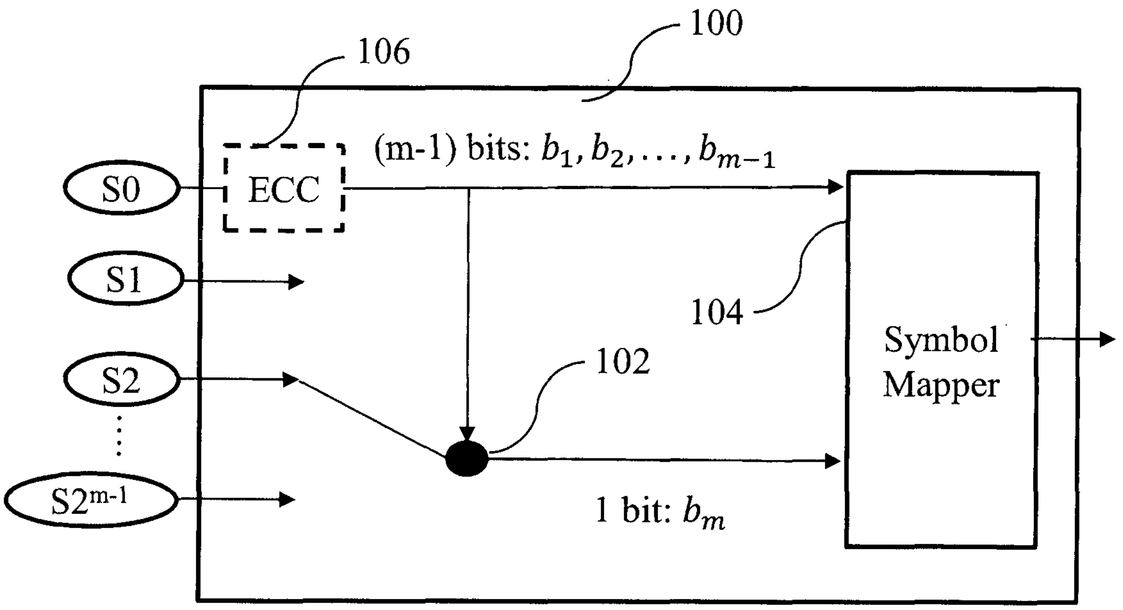
FIG. 4A depicts a block diagram of a shaping encoder according to a specific embodiment.
Figure 4B:
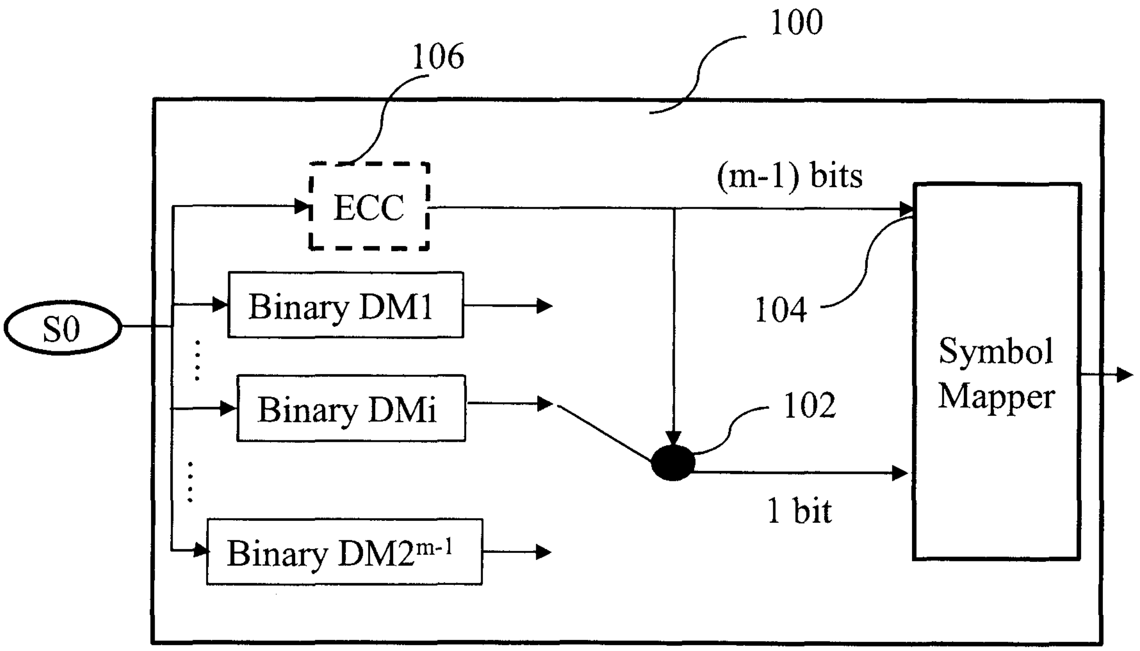
FIG. 4B depicts a block diagram of a shaping encoder according to another specific embodiment.

As depicted on FIG. 3A, in the case of an M-ASK constellation wherein each symbol in the constellation is represented by a binary sequence using natural labelling where the less significant bits are on the left, a shaping encoder 100 can be implement as depicted on FIGS. 4A and 4B with the most significant bit $b_m$ being the shaping bit. The natural labelling of the 8-ASK constellation is provided by the following Table 1.

TABLE 1

| Symbols | −7 | −5 | −3 | −1 | 1 | 3 | 5 | 7 |
|---|---|---|---|---|---|---|---|---|
| Bit-level 1 ($b_1$) | 0 | 1 | 0 | 1 | 0 | 1 | 0 | 1 |
| Bit level 2 ($b_2$) | 0 | 0 | 1 | 1 | 0 | 0 | 1 | 1 |
| Bit level 3 ($b_3$) | 0 | 0 | 0 | 0 | 1 | 1 | 1 | 1 |

Figure 3B:
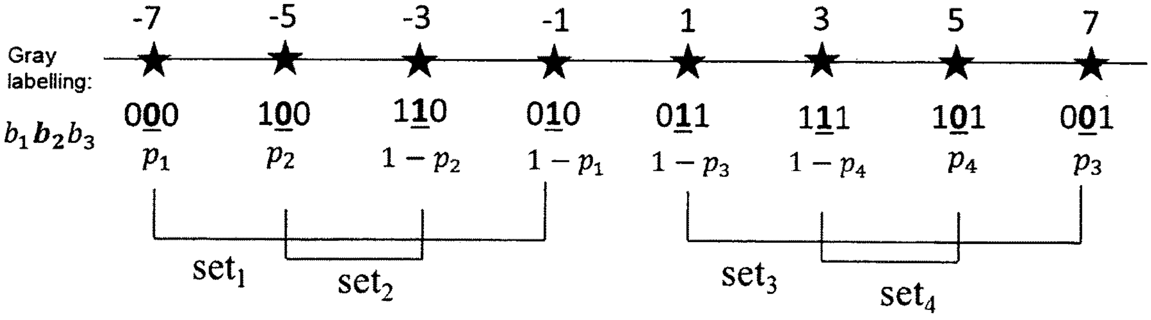
FIG. 3B illustrates an alternative division of an M-ASK constellation into M/2 sets of two symbols according to a specific embodiment.
Figure 4C:
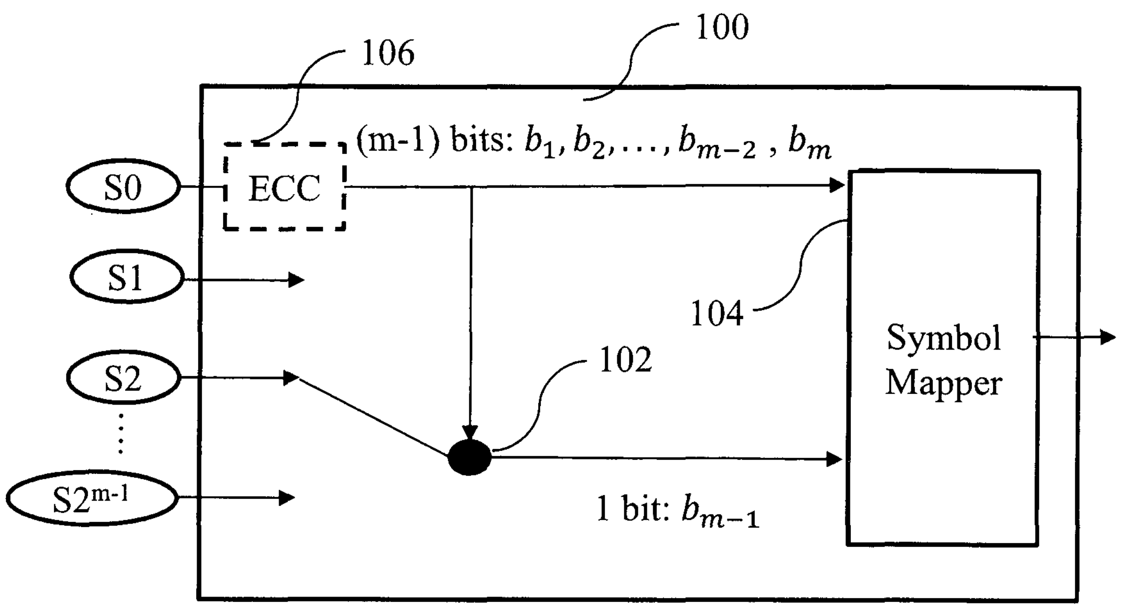
FIG. 4C depicts a block diagram of a shaping encoder according to another specific embodiment.

As depicted on FIG. 3B, in the case of an M-ASK constellation wherein each symbol in the constellation is represented by a binary sequence using Gray labelling where the less significant bits are on the left, a shaping encoder 100 can be implement as depicted on FIG. 4C. The Gray labelling of the 8-ASK constellation is provided by the following Table 2A.

TABLE 2A

| Symbols | −7 | −5 | −3 | −1 | 1 | 3 | 5 | 7 |
|---|---|---|---|---|---|---|---|---|
| Bit-level 1 ($b_1$) | 0 | 1 | 1 | 0 | 0 | 1 | 1 | 0 |
| Bit level 2 ($b_2$) | 0 | 0 | 1 | 1 | 1 | 1 | 0 | 0 |
| Bit level 3 ($b_3$) | 0 | 0 | 0 | 0 | 1 | 1 | 1 | 1 |

In this case, the shaping bit is $b_{m-1}$ and thus the shaping bit is not the most significant bit.

In a variant, a different Gray labelling is used which is illustrated in Table 2B. In Table 2B the last two lines are inverted compared to Table 2A. In this latter case, a shaping encoder 100 can be implement as depicted on FIG. 4A with the most significant bit $b_m$ being the shaping bit.

TABLE 2B

| Symbols | −7 | −5 | −3 | −1 | 1 | 3 | 5 | 7 |
|---|---|---|---|---|---|---|---|---|
| Bit-level 1 ($b_1$) | 0 | 1 | 1 | 0 | 0 | 1 | 1 | 0 |
| Bit level 2 ($b_2$) | 0 | 0 | 0 | 0 | 1 | 1 | 1 | 1 |
| Bit level 3 ($b_3$) | 0 | 0 | 1 | 1 | 1 | 1 | 0 | 0 |

The shaping encoder 100 is part of the transmitter 10. The shaping encoder 100 comprises a switch 102 and a symbol mapper 104 that can use natural labelling or Gray labelling and is configured to implement a shaping method such as the one whose flowchart is depicted on FIG. 5. Optionally, the shaping encoder 100 further comprises an ECC (English acronym of "Error-Correcting Code") module 106 also called channel coding module. The ECC module 106 usually takes as input k*(m−1) bits and outputs n*(m−1) bits where k and n are predefined integer values, e.g. k=500 and n=1000. The higher n*(m−1) (for a given ratio k/n), the better the performances. On the other hand, the latency increases with n*(m−1).

On FIGS. 4A and 4C, the shaping encoder 100 is fed with bits by binary sources S0 to $S2^{m-1}$. Let $S_{max}+1$ be the number of distinct binary sources (i.e. including $S_0$), i.e. $S_{max}=2^{m-1}$. The source S0 outputs bits with equal probabilities p(0)=p(1)=½. Each source Si with i $\in$[1; $2^{m-1}$] is configured to output bits equal to 0 with a probability $p_i$ and thus bits equal to 1 with a probability $(1-p_i)$.

On FIG. 4B, the shaping encoder 100 is fed with bits by a single binary sources S0 that outputs bits with equal probabilities p(0)=p(1)=½. In this case, the sources S1 to $S2^{m-1}$ are obtained from this single source S0 for example by using binary DMs (English acronym of "Distribution Matcher"), namely one per source S1 to $S2^{m-1}$. Binary DMs are for example disclosed in the document from Böhnke et al. entitled "*Polar coded distribution matching*" published in Electron. Lett., vol. 55, no. 9, pp. 537-539, 2019. It will be appreciated, however, that the present embodiments are not restricted to this specific method for obtaining the sources S1 to $S2^{m-1}$ In the case where the shaping encoder 100 of FIG. 4B does not comprise an ECC module, for each given source Si, DMi takes as input $$\frac{r}{S\max}H(p_i)$$

generated by the source s0 and outputs $$\frac{r}{S\max}\text{ bits}$$

where $S_{max}=2^{m-1}$, each bit is equal to 0 with a probability $p_i$, r being a predefined integer value greater or equal to 1 and H $(p_i)$ being the binary entropy with parameter $p_i$. Thus, the output of each DMi is considered as a source Si outputting bits equal to 0 with a probability $p_i$.

In the case where the shaping encoder 100 of FIG. 4B comprises an ECC module 106 which encodes k*(m−1) bits into n*(m−1) bits, and repeats this operation r times, each DMi takes as input $$\frac{r*n}{S\max}H(p_i)$$

generated by the source S0 and outputs $$\frac{r*n}{S\max}\text{ bits}$$

where $S_{max}=2^{m-1}$, each bit is equal to 0 with a probability $p_i$.

Figure 5:
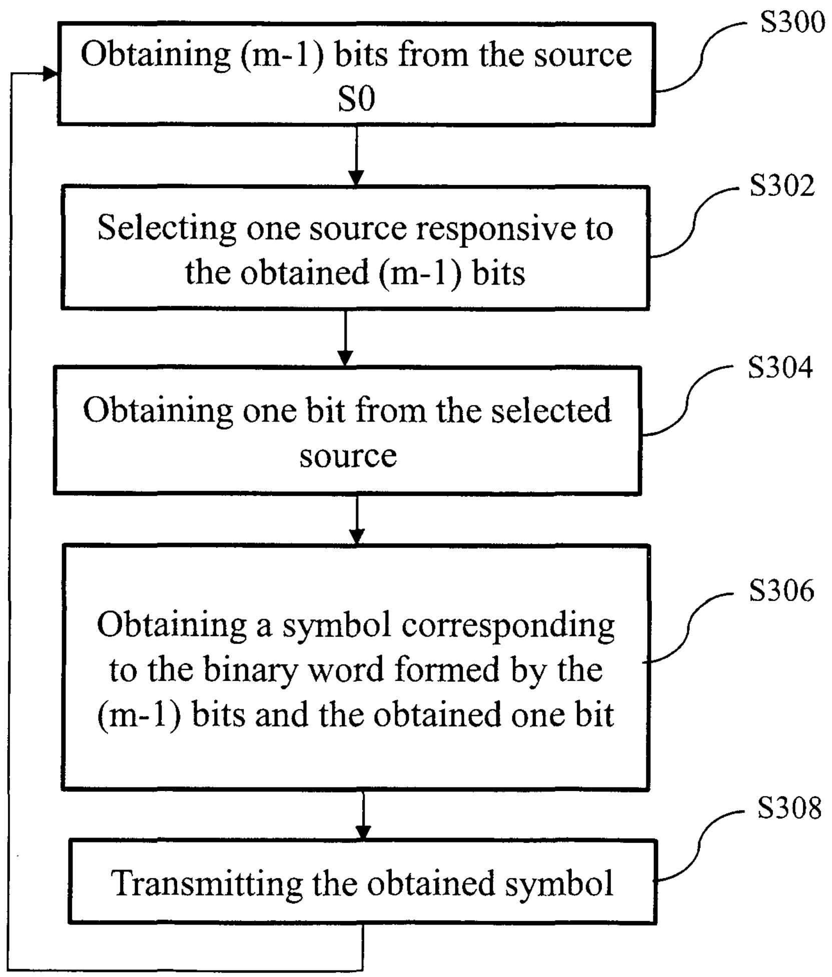
FIG. 5 depicts a flowchart of a transmitting method according to a specific embodiment.

Back to FIG. 5, at step S300, (m−1) bits are obtained from the source S0. In one embodiment (natural labelling), these (m−1) bits are $(b_1, b_2, \ldots, b_{m-1})$ and form the LSB bits of the symbol. Since, the M-ASK constellation is divided into M/2 sets of two symbols containing the i th and $$i+\frac{M}{2}th$$

symbols $$1\leq i\leq\frac{M}{2},$$

the two symbols that belong to the same set have identical LSB bits. For example with reference to FIG. 3A, the symbols -5 and 3 that belong to $set_2$ have "10" as LSB bits.

Therefore, obtaining (m−1) bits from the source S0 makes it possible to select one set among the M/2 sets and thus one source Si.

In another embodiment (Gray labelling of Table 2B), these (m−1) bits are ($b_1$, $b_2$, . . . , $b_{m-1}$) and form the LSB bits of the symbol. Since, the M-ASK constellation is divided into M/2 sets of two symbols containing the i th and $$\frac{M}{2}+1-i$$

th symbols $$1 \le i \le \frac{M}{4} \text{ and } \frac{M}{2}+1 \le i \le \frac{3M}{4},$$

the two symbols that belong to the same set have identical LSB bits.

In another embodiment (Gray labelling of Table 2A), these (m−1) bits are the bits ($b_1$, $b_2$, . . . , $b_{m-2}$,$b_m$).

At step S302, one source Si is selected by the switch 102 among the $2^{m-1}$ binary sources responsive to the (m−1) bits obtained from S0. Indeed, there is a one-to-one mapping between each possible binary sequence of (m−1) bits and the $2m^{-1}$ sets (and thus the $2m^{-1}$ sources). In the case of natural labelling or Gray labelling of Table 2B, the index i of the selected set/source is equal to the decimal value D ($b_1$, $b_2$, . . . , $b_{m-1}$) of the binary sequence ($b_1$, $b_2$, . . . , $b_{m-1}$) of (m−1) bits incremented by 1, i.e. 1+D ($b_1$, $b_2$, . . . , $b_{m-1}$). Each symbol in the constellation being represented by a binary sequence using natural labelling with the less significant bits on the left, the value $$D(b_1, b_2, \ldots , b_{m-1}) = \sum_{j=1}^{m-1} 2^{(j-1)} * b_j.$$

Binary natural labelling is illustrated on FIG. 3A for the 8-ASK constellation. In the case of Gray labelling (Table 2A), the index i of the selected set/source is equal to the decimal value D ($b_1$, $b_2$, . . . , $b_{m-2}$, $b_m$) of the binary sequence ($b_1$, $b_2$, . . . , $b_{m-2}$, $b_m$) of (m−1) bits incremented by 1.

At step S304, a bit, called shaping bit, is obtained from this selected source. The obtained bit is the MSB $b_m$ of the symbol in the case of natural labelling and Gray labelling of Table 2B. In the case of Gray labelling of FIG. 2A, the obtained bit is $b_{m-1}$. Thus, the (m−1) bits obtained at S300 control the switch to select one source from which the shaping bit, e.g. the MSB in case of natural labelling or Gray labelling of Table 2B, is outputted.

At step S306, the symbol mapper 104 thus generates the symbol to be transmitted corresponding to the binary word formed by the (m−1) bits obtained at S300 as LSB and the selected bit obtained at S304 as MSB in the case of the natural labelling and Gray labelling of Table 2B. In the case of Gray labelling of Table 2A, the symbol mapper 104 thus generates the symbol to be transmitted corresponding to the binary word formed by the (m−1) bits ($b_1$, $b_2$, . . . , $b_{m-2}$,$b_m$) obtained at S300 and the selected bit $b_{m-1}$ obtained at S304. The binary word is thus ($b_1$, $b_2$, . . . , $b_{m-1}$, $b_m$), the LSB being on the left.

At step S308, the obtained symbol is transmitted over the communication channel 12 to the receiver 14. The steps S300 to S308 may be repeated for a next set of (m−1) bits.

In the case where the shaping encoder 100 of FIG. 4A or 4C comprises an ECC module 106 which outputs n sets of (m−1) bits, each set of (m−1) bits is used independently to select one source Si at step S302 and thus one shaping bit. Said otherwise, the steps S300 to S308 are repeated for each set of (m−1) bits outputted by the ECC module 106.

An example is provided below for M=8 and m=3. In this case the various sets are defined in the table below.

| Sets | Index of the sets | (m − 1) LSB bits | Selected source |
|---|---|---|---|
| {−7, 1} | 1 | 00 | S1 |
| {−5, 3} | 2 | 10 | S2 |
| {−3, 5} | 3 | 01 | S3 |
| {−1, 7} | 4 | 11 | S4 |

From two bits "10" obtained from S0 at S300, the set of index 2 is selected and the switch 102 is thus positioned so as to select the source S2 at S302. In the case where the bit obtained from S2 at S304 is "1", the obtained binary word is "101" which is thus mapped at S306 onto symbol 3 of the constellation. Therefore, the symbol 3 is outputted by the symbol mapper 104 and transmitted at S308.

In another example, wherein the two bits obtained at S300 from S0 are "11", the set of index 4 is selected at S302. The switch is positioned to the source S4. In the case where the bit obtained from S4 at S304 is "1", then the symbol mapper outputs at S306 the symbol 7 (corresponding to the binary word "111"). In the case where the bit obtained from S4 at S304 is "0", then the symbol mapper outputs at S306 the symbol "-1" (corresponding to the binary word "110").

Another example is provided below for M=8 and m=3. In this case the various sets are defined in the table below.

| Sets | Index of the sets | (m − 1 = 2) bits ($b_1$ $b_3$) | Selected source |
|---|---|---|---|
| {−7, −1} | 1 | 00 | S1 |
| {−5, −3} | 2 | 10 | S2 |
| {3, 5} | 3 | 11 | S3 |
| {1, 7} | 4 | 01 | S4 |

From two bits "10" obtained from S0 at S300, the set of index 2 is selected and the switch 102 is thus positioned so as to select the source S2 at S302. In the case where the bit obtained from S2 at S304 is "1", the obtained binary word is "110" which is thus mapped at S306 onto symbol -3 of the constellation (see Table 2 with the Gray labelling). Therefore, the symbol -3 is outputted by the symbol mapper 104 and transmitted at S308.

In another example, wherein the two bits obtained at S300 from S0 are "01", the set of index 4 is selected at S302. The switch is positioned to the source S4. In the case where the bit obtained from S4 at S304 is "1", then the symbol mapper outputs at S306 the symbol 1 (corresponding to the binary word "011"). In the case where the bit obtained from S4 at S304 is "0", then the symbol mapper outputs at S306 the symbol "7" (corresponding to the binary word "001").

For some channels, such as the Gaussian channel, p*(x) is symmetric. Consequently, $$p_i = 1 - p_{\frac{M}{2}-i+1},\ 1 \le i \le \frac{M}{4}.$$

With reference to FIG. 3A, p3=1-p2 and p4=1-p1. Taking into account this symmetry, the shaping encoder 100 of FIG.

Figure 6:
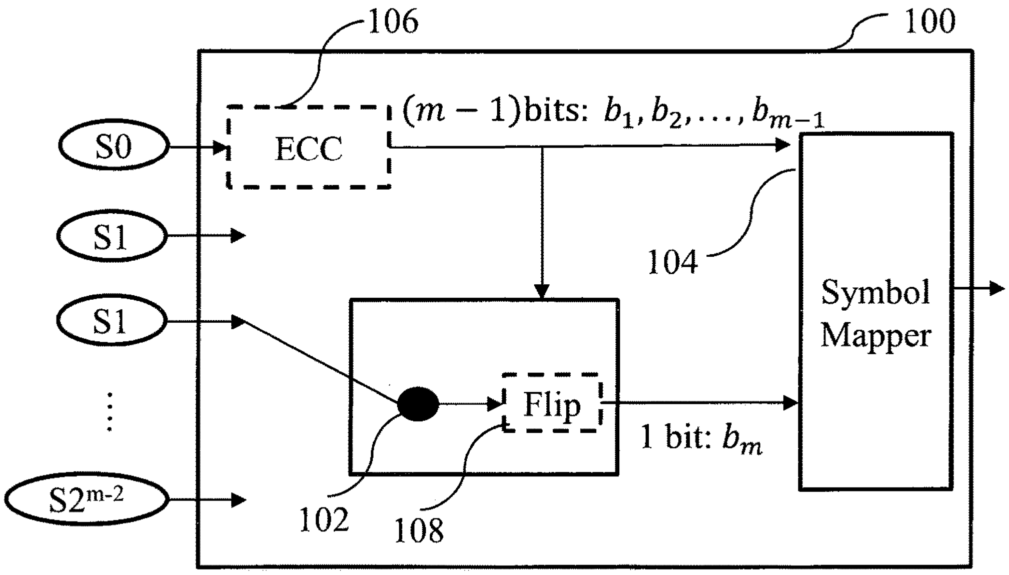
FIG. 6 depicts a block diagram of a shaping encoder according to another specific embodiment.

4A may be further simplified as depicted on FIG. 6 wherein the number of binary sources is divided by two and bit flipping is used when some sources are selected. In this case, $$S_{max}=2^{m-2}.$$

Let $b_1, b_2, \ldots, b_{m-1}$ be the m−1 bits obtained at S300 from the binary source S0. If $$1 \leq D(b_1, b_2, \ldots, b_{m-1}) + 1 \leq \frac{M}{4},$$

the switch selects at S302 the corresponding source as on FIG. 4, i.e. selects the source of index D $(b_1, b_2, \ldots, b_{m-1})+1$ and the bit obtained at S304 from the selected source is not flipped. If $$\frac{M}{4} + 1 \leq D(b_1, b_2, \ldots, b_{m-1}) + 1 \leq \frac{M}{2},$$

and the switch selects at S302 the source of index $$\frac{M}{2} - D(b_1, b_2, \ldots, b_{m-1})$$

and the bit obtained at S304 from the selected source is not flipped.

An example is provided below for M=8 and m=3. In this case the various sets are represented in the table below. In this case, only 3 binary sources (S0, S1 and S2) are needed instead of 5.

| Sets | Index of the sets | (m − 1) LSB bits | Selected source |
|---|---|---|---|
| {−7, 1} | 1 | 00 | S1 |
| {−5, 3} | 2 | 10 | S2 |
| {−3, 5} | 3 | 01 | S2 (followed by flipping) |
| {−1, 7} | 4 | 11 | S1 (followed by flipping) |

From two bits "10" obtained from S0 at S300, the set of index 2 is selected and the switch 102 is thus positioned so as to select the source S2 at S302. In the case where the bit obtained from S2 at S304 is "1", the obtained binary word is "101" which is thus mapped at S306 onto symbol 3 of the constellation. Therefore, the symbol 3 is output by the symbol mapper 104 and transmitted at S308.

In another example wherein the two bits obtained at S300 from S0 are "11", then the set of index 4 is selected. The switch 102 is thus positioned so as to select the source S1 at S302. In the case where the bit obtained at S304 from S1 is equal to "1", it is flip (i.e. changed to 0) by a flipping module 108. Finally, the symbol mapper outputs the symbol "−1" (corresponding to the binary word "110"). In the case where the bit obtained at S304 from S1 is equal to "0", it is flip (i.e. changed to 1) by the flipping module 108. Finally, the symbol mapper outputs the symbol "7" (corresponding to the binary word "111"). Thus, bit flipping only applies when the sets of indices 3 and 4 are selected.

In a variant (not represented on FIG. 6), the shaping encoder 100 is fed with bits by a single binary sources S0 that outputs bits with equal probabilities p(0)=p(1)=½. In this case, the sources S1 to $S2^{m-2}$ are obtained from this single source S0 by using binary DMs (English acronym of "Distribution Matcher"), one per source S1 to $S2^{m-2}$ in the same way as depicted on FIG. 4B. Thus, in the case where the shaping encoder does not comprise an ECC module, for each given source Si, DMi takes as input $$\frac{r}{S\max} H(p_i)$$

generated by the source S0 and outputs $$\frac{r}{S\max} \text{bits}$$

where $$S_{max}=2^{m-2}.$$

In the case where the shaping encoder comprises an ECC module which encodes k*(m−1) bits into n*(m−1) bits, and repeats this operation r times, each DMi takes as input $$\frac{r*n}{S\max} H(p_i)$$

generated by the source S0 and inputs $$\frac{r*n}{S\max} \text{bits}$$

where $$S_{max}=2^{m-2}.$$

With reference to FIG. 3B (Gray labelling of Table 2A), p1−p3 and p2=p4. Taking into account this symmetry, the shaping encoder 100 of FIG. 4C may be further simplified by dividing the number of binary sources by two. In this case, the selected binary source is the source whose index equal D $(b_1, b_2, \ldots, b_{m-2}, b_m)+1 \bmod (M/2+1)$.

In the case of Gray labelling of Table 2B, the shaping encoder 100 of FIG. 4A may be further simplified by dividing the number of binary sources by two. In this case, the selected binary source is the source whose index equal D $(b_1, b_2, \ldots, b_{m-1})+1 \bmod (M/2+1)$.

For further complexity reduction, the number of distinct binary sources can be reduced by forcing adjacent symbols to have the same probability. For instance, for the 8-ASK p2 is set equal to p1. Symbol assigned with the same $p_i$ selects bits from the same binary source. $p(x) = \in \widehat{p^*}(x)$ even in the case where $S_{max}$ is small (e.g. equal to 2). In practice, two additional binary sources in addition to $S_0$ are sufficient to get most of the shaping gain for the Gaussian channel. Thus, it is possible to achieve near-optimal performance with a low number of binary sources. Limiting the number of binary sources provides several advantages, such as:

- reducing the complexity (in terms of number of operations required) of the shaping encoder and thus of the transmitter;
- reducing the complexity for the optimization of the probabilities;
- reducing the signaling between the transmitter and the receiver when the transmitter first signals the $p_i$ values; and
- reducing the size of the table when both transmitter and receiver obtain the $p_i$ values from a table.

Figure 7:
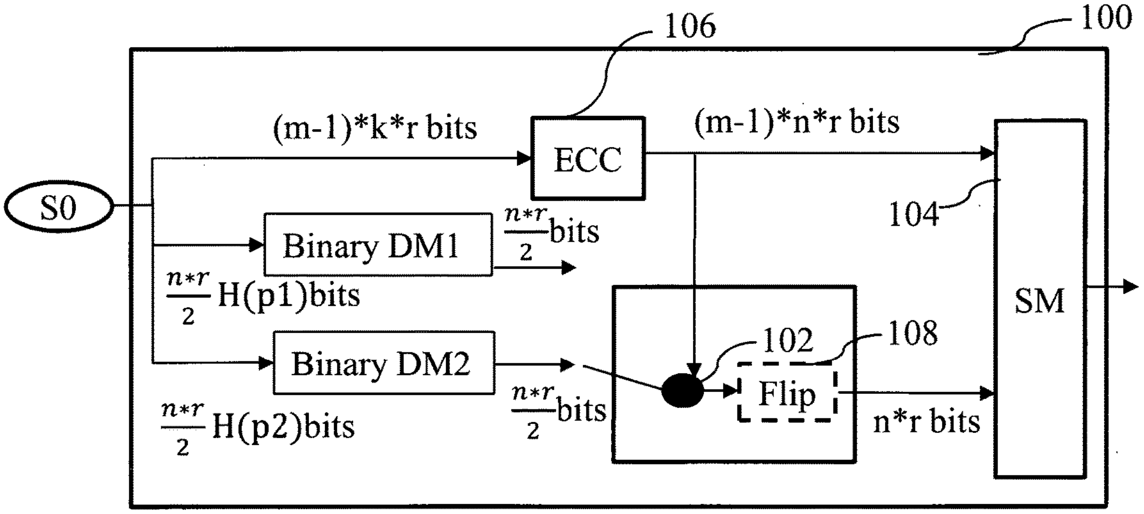
FIG. 7 depicts a block diagram of a shaping encoder according to another specific embodiment.

In general, only a single binary source S0 is available. In one example, the binary source S0 is equiprobable. The additional binary sources are thus obtained from the single binary source S0 as depicted on FIG. 4B. FIG. 7 depicts a shaping encoder 100 according to a specific embodiment wherein two additional binary sources are obtained from the single binary source S0. In this embodiment $S_{max}=2$ and bits have to be processed packet-wise (e.g. due to latency or system constraints). Let H ($p_i$) denote the binary entropy with parameter $p_i$. First, $$(m-1)*k*r+\frac{n*r}{2}(H(p_1)+H(p_2))$$

bits are generated by the source $S_0$. (m−1)*k*r bits are obtained and encoded via an error-correcting code module 106. The error correcting code module 106 outputs (m−1) *n*r bits. In parallel, $$\frac{n*r}{2}H(p_1)\text{ bits and }\frac{n*r}{2}H(p_2)\text{ bits}$$

are processed by two binary distribution matcher DM1 and DM2. DM1 outputs a sequence of $$\frac{n*r}{2}\text{bits}$$

where each bit is equal to 0 with a probability $p_1$ and DM2 outputs a sequence of $$\frac{n*r}{2}\text{ bits}$$

where each bit is equal to 0 with a probability $p_2$. Each of the n sets of m−1 bits, at the output of the error-correcting code module 106, controls the switch 102 to select one shaping bit $b_m$ at the output of the corresponding DM. The method disclosed with respect to FIG. 5 is thus applied on each of the n sets of m−1 bits. Bit flipping as disclosed on FIG. 6 may further be applied depending on the selected source.

It is possible that the switch requests $$\frac{n*r}{2}+\epsilon\text{ bits}$$

from the first DM and $$\frac{n*r}{2}-\epsilon$$

from the second DM, where $\epsilon$ is a random quantity. In the case where one source has no more bits available, a bit is selected from the other source.

Once the M-ASK symbols are obtained using any of the previously described shaping encoder as described with respect to FIGS. 4A to 7, the transmitter 10 transmits them through several dimensions such as polarization, time, frequency and space. For example, the transmitter 10 may group two ASK symbols in a complex symbol, one being the real part and the other the imaginary part. In this case, the M-ASK modulation is also called QAM modulation.

In the various embodiments, the shaping encoder 100 may optionally comprise an ECC module 106 that is used to encode the less significant bits. In an example, the ECC module is configured to encode these bits with multi-level polar coding. The principles of multi-level coding are disclosed below.

Using a chain rule, the mutual information between the input X and the output Y of a communication channel can be expressed as follows:

$$I(X;Y)=I(B_1,B_2,\ldots,B_m;Y)=\sum_{i=1}^{m}I(B_i;Y\mid B_1,\ldots,B_{i-1}),$$

where $B_i$ denotes the random variable corresponding to the ith bit of the labelling considered.

One bit level refers to the channel described by I($B_i$; Y| $B_1$, . . . , $B_{i-1}$). When a binary code is used to transmit information over this ith level the coding rate should be chosen to match I ($B_i$; Y|$B_1$, . . . , $B_{i-1}$). In practice, a back-off which depends on the code used is applied. This communication channel can also be characterized by a log likelihood ratio (LLR).

Let $\mathcal{S}$ be the set of symbols of the constellation obtained with $B_i=0$ and $\mathcal{S}'$ with $B_i=1$, given that $B_1=b_1$, . . . , $B_{i-1}=b_{i-1}$. Given a received symbol y, the LLR is defined as follows:

$$L(y)=\log\frac{p(y\mid x\in\mathcal{S})}{p(y\mid x\in\mathcal{S}')}=\frac{\sum_{x'\in\mathcal{S}}p(y\mid x')p(x')}{\sum_{x''\in\mathcal{S}'}p(y\mid x'')p(x'')}.\tag{2}$$

Since the bits on the first levels remain equiprobable, we have p ($B_i=1|B_1=b_1$, . . . , $B_{i-1}=b_{i-1}$)=p($B_i=0|B_1=b_1$, . . . , $B_{i-1}=b_{i-1}$)=0.5 and the mutual information is computed as follows:

$$I(Y;B_i\mid B_1,\ldots,B_{i-1})=1-E_{B_1,\ldots,B_{i-1}}E_{Y|X_1=0}\left[\log_2\left(1+e^{-L(y)}\right)\right].$$

Regarding the last bit level used for shaping, we have $p(B_m=1|B_1=b_1, \ldots, B_{m-1}=b_{m-1})=p_i$ and $p(B_m=0|B_1=b_1, \ldots, B_{m-1}=b_{m-1})=1-p_i$ and the mutual information is computed as follows:

$$I(Y;B_i\mid B_1,\ldots,B_{i-1})=E_{B_1,\ldots,B_{i-1}}\Big[H(B_i\mid B_1=b_1,\ldots,B_{i-1}=b_{i-1})-E_{Y|X=0}\Big[p\log_2\Big(1+e^{-L(y)}\frac{(1-p)}{p}\Big)+(1-p)\log_2\Big(1+e^{-L(y)}\frac{p}{1-p}\Big)\Big]\Big].$$

For the range of SNR considered, the shaping bit $b_m$ does not need to be encoded with a channel code. The mutual information I(Y; $B_m|B_1$, . . . , $B_{m-1}$) equals the entropy of the corresponding level, i.e. the communication channel is "clean". This is why the shaping bit $b_m$ is not encoded with a channel code in the embodiments previously disclosed. Consequently, the value of k on FIG. 7 may be chosen as $$k = n * \sum_{i=1}^{m-1} I(B_i; Y \mid B_1, \ldots, B_{i-1})/(m-1).$$

Then, multi-level polar coding simply means that each bit level is coded with a polar code with rate I (Y; $B_i$|B1, . . . , $B_{i-1}$). The block length refers to the size of the polar codes used.

On the receiver side, list decoding is used to decode the polar codes. List decoding is disclosed in the document from Tal et al. entitled "List decoding of polar codes" published in 2013 in IEEE Transactions on Information Theory, vol. 61, no. 5, pages 2213-2226. The list decoder performs MAP decoding. Consequently, the decoders take the LLR as inputs (see Equation (2)), which requires the knowledge of the input distribution to be computed. In other words, the receiver needs to know the values of the $p_i$ for list decoding.

Figure 8:
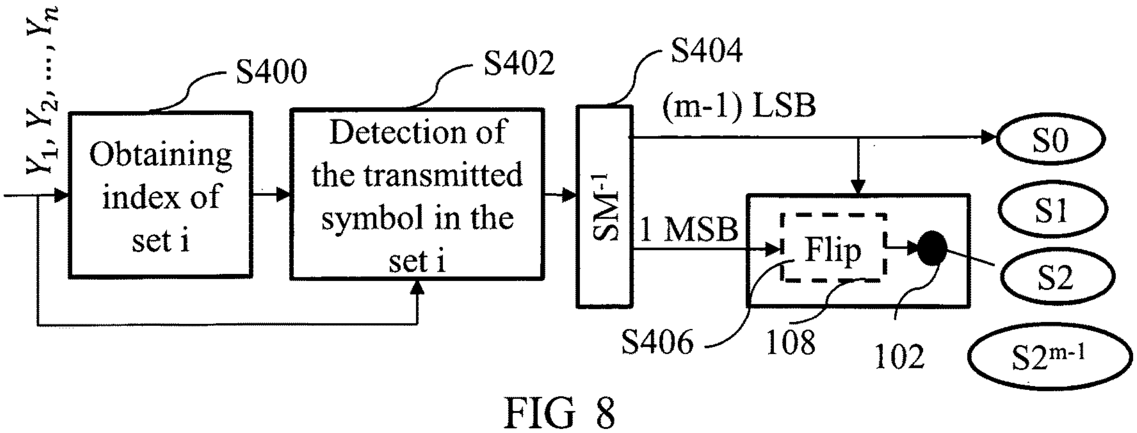
FIG. 8 depicts a flowchart of a decoding method according to a specific embodiment.

FIG. 8 depicts a flowchart of a decoding method according to a specific embodiment.

At a step S400, the index i of the set, thus of the source selected at step S302 on the transmitter side, is first obtained. If the selection of the sets is made block-wise via an error-correcting code by the transmitter, then the index i is obtained by channel decoding (i.e. a block of indices of sets are decoded together).

At step S402, once the index i of the set is decoded, one of the two symbols of the set i is detected based on the received y. Most channel decoders perform maximum a posteriori (MAP) decoding. The detection of the transmitted symbol in the set i may also perform a MAP detection. MAP decoding requires knowing the input distribution. In other words, the receiver needs to know the values of the $p_i$ for efficient decoding.

In some cases, it is sufficient to perform maximum likelihood (ML) detection in the set i (because the reliability is high enough such that taking into account the a priori probabilities is not needed). As a result, the knowledge of the $p_i$ may be used only by the channel decoder.

At step S404, inverse mapping is applied to recover the bits from the detected symbol. This step is the inverse of the step S306. At step S406, the inverse of step S302 applies. Thus, a switch 102 is positioned to send the shaping bit, i.e. the MSB bit in case of natural labelling or Gray labelling of Table 2B, to the appropriate source. Possibly, inverse binary DMs apply in the case where binary DM where used on the transmitter side.

In the case where bit flipping is applied on the transmitter side, bit flipping is applied on the receiver side at step S406 by flipping module 108. The decoded bit is flipped if $$\frac{M}{4} + 1 \le D(\widehat{b_1}, \widehat{b_2}, \ldots, \widehat{b_{m-1}}) + 1 \le \frac{M}{2},$$

where $\widehat{b_1}$, $\widehat{b_2}$, . . . , $\widehat{b_{m-1}}$ represent the values of the decoded less significant bits.

Figure 9:
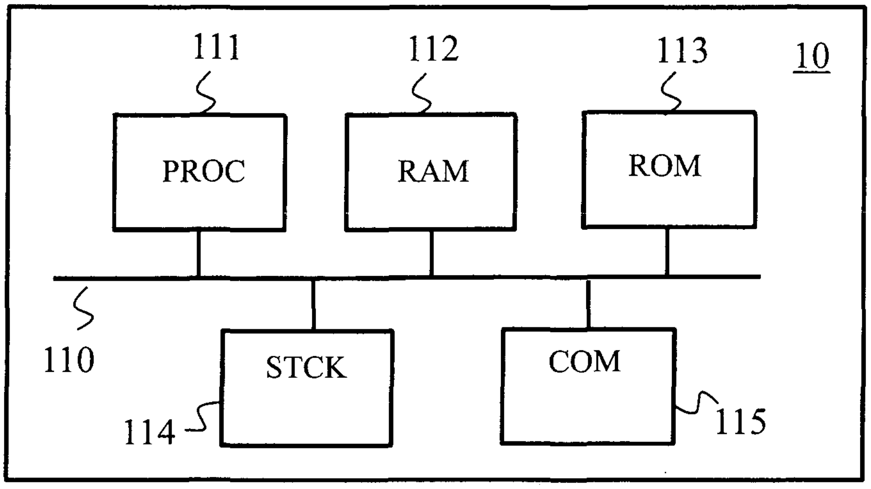
FIG. 9 illustrates schematically an example of hardware architecture of a shaping encoder according to a specific embodiment.

FIG. 9 illustrates schematically an example of hardware architecture of a transmitter 10 according to a specific embodiment.

The transmitter 10 comprises, connected by a communication bus 110: a processor or CPU (acronym of "Central Processing Unit") 111; a random access memory RAM 112; a read only memory ROM 113; a storage unit 114 such as an hard disk or such as a storage medium reader, e.g. an SD (acronym of "Secure Digital") card reader; and at least one set of communication interfaces COM 115 enabling the transmitter 10 to transmit and receive data.

The processor 111 is capable of executing instructions loaded into the RAM 112 from the ROM 113, from an external memory (such as an SD card), from a storage medium (such as the HDD), or from a communication network. When the transmitter 10 is powered up, the processor 111 is capable of reading instructions from the RAM 112 and executing them. These instructions form a computer program causing the implementation, by the processor 111, of the methods described in relation to FIGS. 4A to 7.

The methods described in relation to FIGS. 4A to 7 may be implemented in software form by the execution of the set of instructions by a programmable machine, for example a DSP (acronym of "Digital Signal Processor"), a microcontroller or a GPU (acronym of "Graphics Processing Unit"), or be implemented in hardware form by a machine or a dedicated component (chip or chipset), for example an FPGA (acronym of "Field-Programmable Gate Array") or an ASIC (acronym of "Application-Specific Integrated Circuit"). In general, the transmitter 10 includes electronic circuitry adapted and configured for implementing the methods described in relation to FIGS. 4A to 7.

Figure 10:
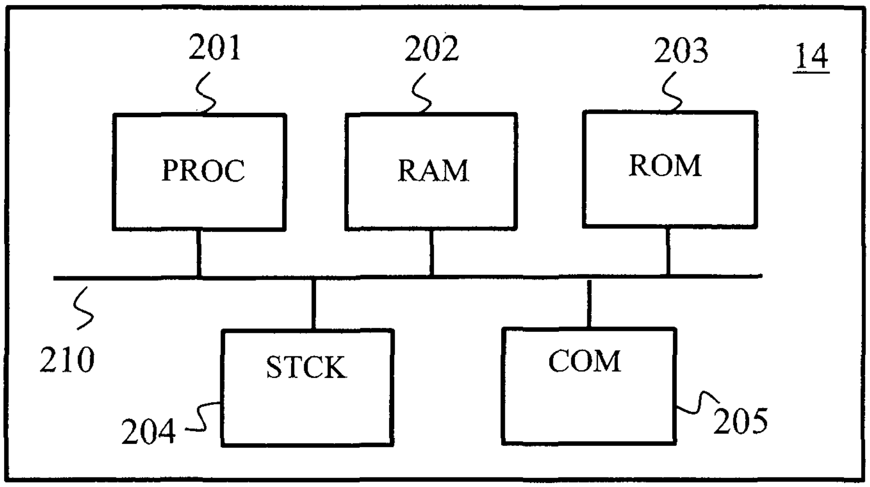
FIG. 10 illustrates schematically an example of hardware architecture of a decoding device according to a specific embodiment.

FIG. 10 illustrates schematically an example of hardware architecture of a receiver 14 according to a specific embodiment.

The receiver 14 comprises, connected by a communication bus 210: a processor or CPU (acronym of "Central Processing Unit") 201; a random access memory RAM 202; a read only memory ROM 203; a storage unit 204 such as an hard disk or such as a storage medium reader, e.g. an SD (acronym of "Secure Digital") card reader; and at least one set of communication interfaces COM 205 enabling the receiver 14 to transmit and receive data.

The processor 201 is capable of executing instructions loaded into the RAM 202 from the ROM 203, from an external memory (such as an SD card), from a storage medium (such as the HDD), or from a communication network. When the receiver 14 is powered up, the processor 201 is capable of reading instructions from the RAM 202 and executing them. These instructions form a computer program causing the implementation, by the processor 201, of the method described in relation to FIG. 8.

The method described in relation to FIG. 8 may be implemented in software form by the execution of the set of instructions by a programmable machine, for example a DSP (acronym of "Digital Signal Processor"), a microcontroller or a GPU (acronym of "Graphics Processing Unit"), or be implemented in hardware form by a machine or a dedicated component (chip or chipset), for example an FPGA (acronym of "Field-Programmable Gate Array") or an ASIC (acronym of "Application-Specific Integrated Circuit"). In general, the receiver 14 includes electronic circuitry adapted and configured for implementing the method described in relation to FIG. 8.

The invention claimed is:

1. A method, in a transmitter, for transmitting binary data using an M-Amplitude-Shift Keying (M-ASK) constellation divided into M/2 sets of two symbols, each set of index i being associated with a probability pi of transmitting the first symbol of the set and a probability 1−pi of transmitting the second symbol of the set and wherein each symbol of the M-ASK constellation is associated with a binary word defined with a given labelling, said method comprising:

a) obtaining m−1 bits from a binary source where m = $\log_2 M$;

b) selecting the binary source in a plurality of binary sources responsive to said m−1 bits, each binary source of index i being associated with a probability of outputting a bit zero equal to $p_i$;

c) obtaining one bit from the selected binary source;

d) obtaining a symbol of the M-ASK constellation associated with the binary word formed by the m−1 bits obtained from the binary source and the bit obtained from the selected binary source;

e) transmitting said obtained symbol to a receiver over a communication channel.

2. The method according to claim 1, wherein said m−1 bits obtained from the binary source are the less significant bits of the binary word and the bit obtained from the selected binary source is the most significant bit of the binary word.

3. The method according to claim 1, wherein the binary source is equiprobable.

4. The method according to claim 1, wherein selecting the binary source in a plurality of binary sources responsive to said m−1 bits comprises:

determining a decimal value of a binary sequence formed by the m−1 bits; and selecting the binary source whose index equal said decimal value incremented by one.

5. The method according to claim 1, wherein the plurality of binary sources comprises $2^{m-1}$ binary sources.

6. The method according to claim 1, wherein said given labelling is a natural labelling and wherein each set of index i comprises the i th and i+M/2 th symbols of the M-ASK constellation, where i∈[1;M/2].

7. The method according to claim 6, wherein, $$p_i = 1 - p_{\frac{m}{2}-i+1},\ 1 \le i \le \frac{M}{4},$$

the plurality of binary sources is reduced to $2^{m-2}$ binary sources and wherein selecting the binary source responsive to said m−1 bits comprises:

determining a decimal value D of a binary sequence formed by the m−1 bits; and selecting the binary source whose index equal M/2-D in the case where $$\frac{M}{4} + 1 \le D + 1 \le \frac{M}{2};$$

and selecting the binary source whose index equal said decimal value incremented by one, otherwise; and wherein, in the case where the binary source whose index equal M/2-D is selected, the bit obtained from the selected source is flipped before obtaining a symbol of the M-ASK constellation.

8. The method according to claim 1, wherein said given labelling is a Gray labelling and wherein each set of index i comprises the i th and M/2+1-i th symbols of the M-ASK constellation, where i∈

$$[1; M/4] \cup \left[\frac{M}{2} + 1; \frac{3M}{4}\right].$$

9. The method according to claim 8, wherein, $$p_i = 1 - p_{\frac{M}{2}+i},\ 1 \le i \le \frac{M}{4},$$

the plurality of binary sources is reduced to $2^{m-2}$ binary sources and wherein selecting the binary source responsive to said m−1 bits comprises:

determining a decimal value D of a binary sequence formed by the m−1 bits; and selecting the binary source whose index equal D+1 mod (M/2+1), where mod () is a modulo operator.

10. The method according to claim 1, wherein each binary source of index i in the plurality of binary sources is obtained from the binary source by applying binary distribution matching on sequences of $$\frac{r}{S\max} H(p_i) \text{ bits},$$

where $S_{max}$ is the number of sources in the plurality of binary sources, H $(p_i)$ denotes a binary entropy with the probability $p_i$ and r being an integer greater than or equal to 1.

11. The method according to claim 1, further comprising:

encoding r times (m−1) *k bits obtained from the binary source using an error correcting code into (m−1) *n bits, where n and k are integers;

obtaining each binary source of index i in the plurality of binary sources from the binary source by applying binary distribution matching on sequences of $$\frac{r * n}{S\max} H(p_i)$$

bits obtained from the binary source, where $S_{max}$ is the number of sources in the plurality of binary sources and H $(p_i)$ denotes a binary entropy with the probability $p_i$; and applying a) to e) on each of the n sets of (m−1) bits.

12. The method according to claim 10, further comprising obtaining the probabilities $p_i$ from a table and transmitting to said receiver at least one index entry indicating the obtained probabilities.

13. The method according to claim 10, further comprising estimating the probabilities $p_i$ from a predefined communication channel distribution and transmitting said estimated probabilities to said receiver.

14. The method according to claim 10, further comprising receiving the probabilities $p_i$ from the receiver.

15. A non-transitory computer storage medium storing a computer program comprising program code instructions, the program code instructions causing implementation of the method according to claim 1 when the program code instructions are read from the non-transitory computer storage medium and run by a programmable device.

16. A transmitter configured to transmit binary data using an M-Amplitude-Shift Keying (M-ASK) constellation divided into M/2 sets of two symbols, each set of index i being associated with a probability $p_i$ of transmitting the first symbol of the set and a probability $1-p_i$ of transmitting the second symbol of the set and wherein each symbol of the M-ASK constellation is associated with a binary word defined using a given labelling, said transmitter comprising at least one processor configured to:

a) obtain m−1 bits from a binary source where m=log2M;

b) select the binary source in a plurality of binary sources responsive to said m−1 bits, each binary source of index i being associated with a probability of outputting a bit zero equal to $p_i$;

c) obtain one bit from the selected binary source;

d) obtain a symbol of the M-ASK constellation associated with the binary word formed by the m−1 bits obtained from the binary source and the bit obtained from the selected binary source;

e) transmit said obtained symbol to a receiver over a communication channel.

17. The transmitter according to claim 16, wherein said given labelling is a natural labelling and wherein each set of index i comprises the $i^{th}$ and $i^{th}$+M/2 symbols of the M-ASK constellation, where i∈[1;M/2].

18. The transmitter according to claim 16, wherein said given labelling is a Gray labelling and wherein each set of index i comprises the $i^{th}$ and M/2+1-$i^{th}$ symbols of the M-ASK constellation, where i∈

$$[1; M/4] \cup \left[\frac{M}{2}+1; \frac{3M}{4}\right].$$

19. The transmitter according to claim 16, wherein said m−1 bits obtained from the binary source are the less significant bits of the binary word and the bit obtained from the selected binary source is the most significant bit of the binary word.

* * * * *